(12) United States Patent
Glaesemann et al.

(10) Patent No.: US 8,426,767 B2
(45) Date of Patent: Apr. 23, 2013

(54) METHODS FOR LASER SCRIBING AND BREAKING THIN GLASS

(75) Inventors: Gregory Scott Glaesemann, Corning, NY (US); Kyle C Hoff, Painted Post, NY (US); Xinghua Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 820 days.

(21) Appl. No.: 12/550,592

(22) Filed: Aug. 31, 2009

(65) Prior Publication Data

US 2011/0049113 A1 Mar. 3, 2011

(51) Int. Cl.
*B28D 5/0011* (2006.01)

(52) U.S. Cl.
USPC ............... 219/121.68; 219/121.69; 219/121.7

(58) Field of Classification Search ................. 65/29.18, 65/112, 158, 174; 219/121.68, 121.69, 121.7
See application file for complete search history.

(56) References Cited

U.S. PATENT DOCUMENTS

| | | | |
|---|---|---|---|
| 5,132,505 A | 7/1992 | Zonneveld et al. | |
| 5,609,284 A | 3/1997 | Kondratenko | |
| 5,776,220 A | 7/1998 | Allaire et al. | |
| 5,826,772 A | 10/1998 | Ariglio et al. | |
| 6,112,967 A | 9/2000 | Ostendarp et al. | |
| 6,327,875 B1 | 12/2001 | Allaire et al. | |
| 6,489,588 B1 | 12/2002 | Koekstra et al. | |
| 6,811,069 B2 | 11/2004 | Hauer et al. | |
| 7,014,082 B2 | 3/2006 | Hauer et al. | |
| 2004/0169023 A1* | 9/2004 | Tanaka | 219/121.73 |
| 2006/0101858 A1* | 5/2006 | Fujii | 65/29.18 |
| 2007/0039932 A1 | 2/2007 | Haase et al. | |
| 2007/0062921 A1 | 3/2007 | Karube et al. | |
| 2007/0151962 A1 | 7/2007 | Doll et al. | |
| 2007/0228100 A1* | 10/2007 | Gonoe | 225/1 |
| 2008/0283509 A1 | 11/2008 | Abramov et al. | |

FOREIGN PATENT DOCUMENTS

| | | |
|---|---|---|
| EP | 1341730 B1 | 8/2005 |
| GB | 1254120 | 11/1971 |
| WO | 2005115678 A1 | 12/2005 |
| WO | 2007079847 A1 | 7/2007 |

OTHER PUBLICATIONS

Karube et al.; "Laser-Induced Cleavage of LCD Glass As Full-Body Cutting"; Proceedings of SPIE, vol. 6880; pp. 688007-1 to 688007-10; 2008.
Yamamoto et al.; "Three-Dimensional Thermal Stress Analysis on Laser Scribing of Glass"; Precision Engineering, 32 (2008) 301-308.
Yamamoto et al.; "Thermal Stress Analysis on Laser Scribing of Glass"; Journal of Laser Applications; vol. 20, No. 4, (2008) pp. 193-200.

* cited by examiner

*Primary Examiner* — Zandra Smith
*Assistant Examiner* — Tsz Chiu
(74) *Attorney, Agent, or Firm* — Walter M. Douglas (57) ABSTRACT

A method of forming a vent in a glass substrate includes forming a defect in the glass substrate on a scribe line. A beam spot of a laser may be directed onto the defect and advanced along the scribe line. A cooling jet may be directed onto the defect such that the surface of the glass substrate is cooled from a maximum temperature. Thereafter, the cooling spot may be advanced along the scribe line with the beam spot to form the vent in the glass substrate.

19 Claims, 5 Drawing Sheets

METHODS FOR LASER SCRIBING AND BREAKING THIN GLASS

BACKGROUND

1. Field

The present specification generally relates to methods for separating glass and, more specifically, to methods for laser scribing and breaking separating thin glass substrates.

2. Technical Background

Thin glass substrates have a variety of applications in consumer electronic devices. For example, such glass substrates may be used as cover sheets for LCD and LED displays incorporated in mobile telephones, display devices such as televisions and computer monitors and various other electronic devices. Cover sheets used in such devices may be formed by sectioning or separating a large glass substrate into a plurality of smaller glass substrates using various laser cutting techniques.

For example, thin glass substrates having a thickness of greater than about 0.7 mm may be separated by scribe-and-break techniques using a laser to form a vent partially through the thickness of the glass and thereafter applying a mechanical force to the glass substrate to separate the glass substrate into multiple pieces. The benefits of such scribe-and-break techniques are high processing speed and good edge attributes such as edge quality and edge straightness in the finished glass pieces without generating glass chips during the scribing process.

In a typical laser scribe-and-break process a laser is used to heat the glass substrate along a line of separation. The heated glass substrate is then quenched with a water jet which is positioned behind and spaced apart from the trailing edge of the beam of the laser along the line of separation. The quenching generates a tensile stress which is perpendicular to the line of separation. When the tensile stress is applied to a defect introduced in the glass substrate, a vent is generated and propagates in the direction of the line of separation. Thereafter, the glass substrate may be separated mechanically along the vent.

While such techniques are effective for glass substrates having thicknesses of about 0.7 mm or greater, such techniques may not be readily applicable to glass substrates having thicknesses of less than about 0.7 mm as irreversible full body separation often occurs upon quenching (i.e., the vent propagates substantially through the thickness of the glass such that the glass separates). This uncontrolled separation generally leads to poor edge characteristics compared to the scribe and break process. Moreover, full body separation of the substrate along the line of separation prevents the formation of additional, intersecting vents in a single glass substrate.

Accordingly, a need exists for alternative methods for separating thin glass substrates.

SUMMARY

According to one embodiment, a method of forming a vent in a glass substrate includes forming a defect in the glass substrate on a scribe line. A beam spot of a laser may be directed onto the defect and advanced along the scribe line. A cooling jet may be directed onto the defect such that the surface of the glass substrate is cooled from a maximum temperature. Thereafter, the cooling spot may be advanced along the scribe line with the beam spot to form the vent in the glass substrate.

In another embodiment, a method for forming a vent in a glass substrate includes forming a defect in the glass substrate on a scribe line. A laser beam with an elliptical beam spot is then directed onto the defect and the elliptical beam spot is advanced along the scribe line. A cooling jet may be directed onto the defect such that a cooling spot of the cooling jet is within the elliptical beam spot. The cooling spot may be advanced along the scribe line with the elliptical beam spot to form a vent in the glass substrate which does not extend through a thickness of the glass substrate.

In another embodiment, a method for separating a glass substrate into a plurality of pieces may include forming a first defect on a first surface of the glass substrate. A first vent may be opened along a scribe line extending from the first defect, such that the first vent extends only partially through the thickness of the glass substrate. Thereafter, a second defect may be formed on a second surface of the glass substrate. A second vent may be opened along a scribe line extending from the second defect. The second vent may extend partially through the thickness of the glass substrate. The first vent and the second vent may be opened by directing a laser beam with an elliptical beam spot onto the defect and advancing the elliptical beam spot along the scribe line and directing a cooling jet along the scribe line and advancing the cooling jet along the surface of the glass substrate on the scribe line with the elliptical beam spot to form a vent in the glass substrate. A cooling spot of the cooling jet may be at least periodically positioned within the elliptical beam spot. The glass substrate may then be mechanically separated along the first vent and the second vent.

Additional features and advantages of the methods will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION OF THE PREFERRED EMBODIMENTS

Figure 1:
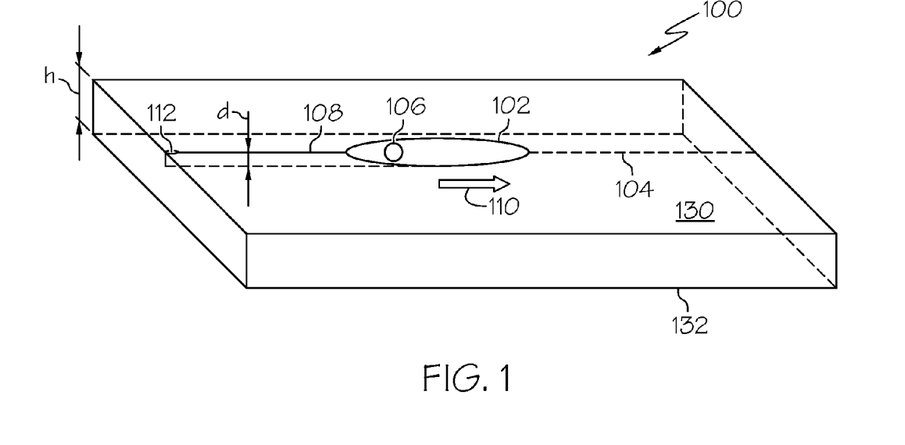
FIG. 1 schematically depicts a perspective view of an elliptical beam spot of a laser beam and a cooling spot of a cooling jet incident on a glass substrate, according to at least one embodiment of the method for forming a vent in a glass substrate shown and described herein.

Reference will now be made in detail to various embodiments of the method for forming vents partially through the thickness of glass substrates, examples of which are illustrated in the accompanying drawings. Whenever possible, the same reference numerals will be used throughout the drawings to refer to the same or like parts. One embodiment of the method for forming a vent in a glass substrate is schematically depicted in FIG. 1. The method generally comprises directing an elliptical beam spot of a laser source onto a glass substrate along a scribe line and directing a cooling spot of a cooling jet onto the substrate such that the cooling spot is positioned within the elliptical beam spot between the center of the elliptical beam spot and the trailing edge. The cooling spot and the elliptical beam spot are then advanced along the scribe line thereby forming a vent extending partially through the thickness of the glass substrate. Various embodiments of the methods for forming vents in glass substrates as well as methods for separating glass substrates into a plurality of pieces will be described in more detail herein.

Figure 2:
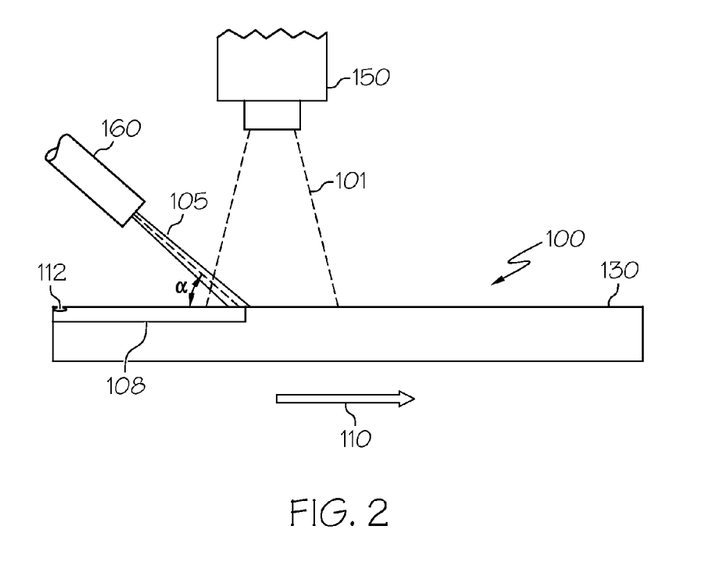
FIG. 2 schematically depicts a cross section of the laser beam, cooling jet and glass substrate of FIG. 1 according to at least one embodiment of the method for forming a vent in a glass substrate described herein.

Referring to FIGS. 1 and 2, an exemplary system for forming a controlled crack or vent 108 extending partially through the thickness of a glass substrate 100 is schematically depicted. The system generally comprises a laser source 150 for heating the glass substrate 100 along a scribe line 104 (i.e., a desired line of separation) and a nozzle 160 for directing a cooling jet 105 for quenching the heated surface of the glass substrate 100 along the scribe line 104. The resulting change in temperature of the glass substrate causes tensile stresses to develop along the scribe line 104 in a direction perpendicular to the scribe line 104 thereby forming a vent 108 which extends partially through the thickness of the glass substrate 100.

In the embodiments described herein, the glass substrate 100 has a first surface 130, a second surface 132 and a thickness h of less than about 0.6 mm and, more preferably, less than about 0.5 mm. The glass substrate may be formed from various glass compositions including, without limitation, borosilicate glasses or aluminosilicate glasses, including ion-exchanged borosilicate and aluminosilicate glasses.

The laser source 150 is operable to emit a beam having a wavelength suitable for imparting thermal energy to the glass substrate 100 such that the laser energy is strongly absorbed through the glass thickness h thereby heating the surface of the glass substrate. For example, the laser source 150 generally emits a beam 101 having a wavelength in the infrared range. Suitable laser sources include a CO laser with a wavelength from about 5 µm to about 6 µm, a HF laser with a wavelength from about 2.6 µm to about 3.0 µm, or an erbium YAG laser with a wavelength of about 2.9 µm. In the embodiments describe herein, the laser source is a $CO_2$ laser which produces a beam of infrared light having a wavelength from about 9.4 µm to about 10.6 µm. The $CO_2$ laser source may be an RF-excited laser source operated in quasi-continuous wave mode. In one embodiment, the laser source 150 is operated to produce an output beam in the $TEM_{00}$ mode such that the beam 101 of the laser source 150 has a Gaussian intensity distribution. Alternatively, the laser source may be operated to produce an output beam in the $TEM_{01}$ mode such that the output beam has a "D" or flat mode intensity distribution. The output power of the laser source may be from about 10 Watts to greater than 200 Watts depending on the desired scribing speed and the composition of the glass being scribed.

In order to avoid overheating the surface of the glass substrate 100 (which may lead to ablation or vaporization of glass from the surface of the glass substrate or residual stresses which weaken the cut edge), the beam 101 emitted by the laser source is shaped with various optical elements (not shown) such that the beam 101 has an elliptical beam spot 102 on the surface of the glass substrate 100. For example, in one embodiment, a pair of cylindrical lenses (not shown) is disposed in the path of the beam 101 emitted from the laser source 150. Alternatively, the cylindrical lenses and/or other optical elements used for shaping the beam to form an elliptical beam spot are integral with the laser source 150. The cylindrical lenses shape the beam 101 such that the beam spot incident on the surface of the glass substrate is generally elliptical in shape, as depicted in FIG. 1.

Figure 3:
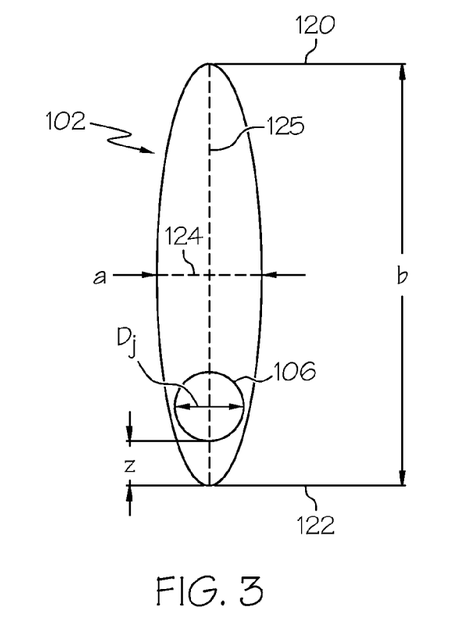
FIG. 3 schematically depicts the relative positioning of the elliptical beam spot and cooling spot according to at least one embodiment of the method of forming a vent in a glass substrate shown and described herein.

Referring to FIG. 3, the elliptical beam spot 102 generally has a minor axis 124 of length a and a major axis 125 of length b. The minor axis 124 extends across the midpoint of the elliptical beam spot as shown in FIG. 3. In one embodiment, the length a of the minor axis 124 is greater than or equal to a diameter of the cooling spot 106 formed where the cooling jet contacts a surface of the glass substrate. For example, if the cooling spot (i.e., the cross section of the cooling jet where the cooling jet is incident on the surface of the glass substrate) has a diameter of 2 mm, then the length a of the minor axis is at least 2 mm.

The major axis 125 generally has a length b between the leading edge 120 and the trailing edge 122 of the elliptical beam spot, as shown in FIG. 3. In the embodiments described herein, the beam 101 of the laser source 150 is shaped such that the length $b \leq 3 \cdot v \cdot \tau$, where v is the rate at which the elliptical beam spot and cooling jet are advanced along the scribe line and $\tau$ is the heat diffusion time through the thickness of the glass substrate, as will be described in more detail herein.

In one embodiment (not shown), a scanning device, such as a polygonal scanning mirror or a scanning galvonometer mirror, is positioned in the optical pathway between the laser source 150 and the glass substrate 100 such that the beam 101 of the laser source may be scanned back and forth along the scribe line 104. For example, the scanning device is operable to scan the beam 101 on the scribe line 104 to facilitate heating the surface 130 of the glass substrate 100 to a maximum temperature without overheating the glass substrate. The scanning device is operable to scan the beam spot over a length from about 10 mm to about 200 mm on the surface of the substrate.

Referring to FIGS. 2 and 3, the cooling jet 105 generally comprises a flow of pressurized fluid emitted from a nozzle 160 and directed onto the surface of the glass substrate 100. The pressurized fluid may comprise a liquid, such as, for example, water, ethanol, liquid nitrogen and/or a chemical coolant. Alternatively, the cooling jet 105 may comprise a compressed gas such as, for example, compressed air, compressed nitrogen, compressed helium or a similar compressed gas. The cooling jet may also comprise a mixture of liquid and compressed gas. In the embodiments described herein the cooling jet is de-ionized water.

The cooling jet 105 is emitted from an orifice (not shown) in the end of the nozzle. The cooling spot 106 formed where the cooling jet is incident on the surface of the glass substrate has a diameter $D_j$ which is larger than the orifice in the nozzle 160. The nozzle 160 is positioned behind the laser source 150 with respect to the scribing direction 110. In the embodiments described herein, the nozzle 160 is oriented at an angle with respect to the surface 130 of the glass substrate 100 such that the cooling jet 105 is incident on the surface of the glass substrate at an angle α which is less than 90 degrees relative to the surface of the glass substrate.

Referring to FIGS. 1 and 2, the method of forming a vent extending partially through the thickness h of a glass substrate 100 includes first introducing a defect 112 in a surface 130 of the glass substrate 100 to form a vent initiation point. The defect is generally positioned on the surface of the glass substrate such that the defect lies along the scribe line 104 along which the glass substrate may be subsequently separated. In one embodiment, the defect is positioned directly adjacent an edge of the glass substrate as shown in FIG. 1. Alternatively, the defect may be offset from the edge of the glass substrate. The defect 112 may be formed mechanically, such as with a mechanical scribe, or by laser ablation.

After the defect is formed, a beam 101 from the laser source 150 is directed onto the surface of the glass substrate 100 such that the beam is incident on the scribe line 104. The beam is initially directed onto the substrate such that the defect 112 is positioned within the elliptical beam spot 102 of the beam 101 and the major axis 125 of the elliptical beam spot 102 is substantially collinear with the scribe line 104. When the beam of the laser source 150 is positioned on the surface 130 of the glass substrate 100, the beam imparts radiant thermal energy to the glass substrate thereby heating the glass substrate along the scribe line 104. The maximum temperature $T_{max}$ to which the glass surface is heated is generally less than the strain point of the glass $T_g$ so as to avoid stress relaxation during heating and the development of undesirable residual stresses following quenching by the cooling jet. The temperature of the glass substrate may be controlled by adjusting various parameters including, for example, the power of the laser source and the scribing speed v with which the beam of the laser is advanced over the surface of the glass substrate along the scribe line. After the beam 101 is initially positioned on the scribe line 104, the elliptical beam spot 102 is advanced along the surface 130 of the glass substrate 100 on the scribe line 104 at the scribing speed v thereby heating the surface of the glass substrate along the scribe line 104. The elliptical beam spot is advanced over the surface by moving the laser source 150 relative to the substrate. Alternatively, the elliptical beam spot may be advanced by moving the substrate relative to the laser source 150 and water jet 160. In either embodiment, the scribing direction 110 (i.e., the direction of vent propagation) is as indicated in FIGS. 1 and 2.

In order to form a vent 108 in the surface 130 of the glass substrate, the heated surface of the glass substrate is cooled or quenched with the cooling jet 105 emitted from the nozzle 160. The change in temperature due to quenching causes tensile stresses to develop in the surface of the glass substrate in a direction perpendicular to the scribe line 104. These tensile stresses cause the vent 108 to initiate from the defect 112 and propagate along the surface of the glass substrate on the scribe line 104. In the embodiments described herein, the vent 108 extends beneath the surface of the substrate to a depth d which is less than half of the thickness h of the glass substrate. In one embodiment, the depth d is less than a quarter of the thickness h of the glass substrate. In order to initiate and propagate the vent 108 along the surface of the glass substrate, a threshold change in temperature $\Delta T_{TH}$ must be exceeded by the heating and subsequent cooling of the surface of the glass substrate in order to generate tensile stresses sufficient for vent initiation and propagation.

More specifically, heating the glass substrate with the laser source 150 and quenching the heated surface of the glass substrate with the cooling jet 105 generates a tensile stress in the surface of the glass substrate perpendicular to the scribe line 104. If the tensile stress exceeds the threshold tensile stress $\sigma_{TH}$ of the material from which the glass substrate 100 is formed, a crack or vent 108 forms in the glass substrates. The threshold tensile stress $\sigma_{TH}$ for forming and propagating a vent 108 may be written as:

$$\sigma_{TH} \cong \frac{1}{2} \cdot CTE \cdot E \cdot \Delta T_{TH}, \qquad (1)$$

where CTE is the coefficient of thermal expansion of the glass substrate, E is Young's modulus of the glass substrate and $\Delta T_{TH}$ is the threshold change in temperature for vent formation and propagation. Equation (1) can be rewritten to define the temperature change $\Delta T_{TH}$ for forming and propagating a vent in the glass substrate such that:

$$\Delta T_{TH} \geq \frac{2\sigma_{TH}}{CTE \cdot E}. \qquad (2)$$

Accordingly, in order to facilitate vent formation and propagation, the change in temperature of the glass following quenching should be equal to or greater than $\Delta T_{TH}$ in order to generate tensile stresses of sufficient magnitude to initiate and propagate the vent.

Referring to Equation (2), the threshold change in temperature $\Delta T_{TH}$ for forming and propagating a vent varies with the inverse of the coefficient of thermal expansion of the glass substrate. Accordingly, for glass substrates formed from glass compositions having a relatively low CTE, such as borosilicate glass, a relatively greater temperature drop is needed to facilitate vent formation and propagation as compared to aluminosilicate glasses which have a relatively greater coefficient of thermal expansion and thus do not require as great of a temperature drop.

For example, certain borosilicate glasses have a CTE of approximately $32 \times 10^{-7}/°$ C., a Young's modulus of 72 GPa and a threshold tensile stress of 50 MPa. Utilizing Equation (2), the minimum temperature drop to facilitate vent formation and propagation in such borosilicate glasses is 430° C. In contrast, certain aluminosilicate glasses have a CTE of approximately $91 \times 10^{-7}/°$ C., a Young's modulus of 73 GPa and a threshold tensile stress of 50 MPa. The minimum temperature drop to facilitate vent formation and propagation in such aluminosilicate glasses is 150° C.

An additional consideration is the thickness of the glass substrate and the corresponding rate of thermal diffusion through the glass. For example, the depth d to which the vent extends beneath the surface of the glass substrate is dependent on the thermal diffusion length l of the glass substrate. The thermal diffusion length l is the distance heat diffuses into the glass substrate over a given period of time t and can be described mathematically as:

$$l = 2\sqrt{D \cdot t} = 2\sqrt{\frac{\kappa \cdot t}{\rho \cdot C_p}}, \quad (3)$$

where D is the thermal diffusivity of the glass substrate, $\kappa$ is the thermal conductivity of the glass substrate, $\rho$ is the density of the glass substrate, t is time and $C_p$ is the heat capacity of the glass substrate. The depth d of the vent is generally less than or equal to the thermal diffusion length l. For example, when the thermal diffusion length l is about half of the thickness h of the glass substrate, compressive stresses at the center of the glass substrate and ahead of the thermal diffusion front counteract the tensile stresses induced by quenching and inhibit propagation of the vent through the entire thickness h of the substrate.

Equation (3) may be rearranged to calculate the timer needed for heat to diffuse through the entire thickness h of a glass substrate such that:

$$\tau = \frac{\rho \cdot C_p}{4\kappa} h^2. \quad (4)$$

Figure 6:
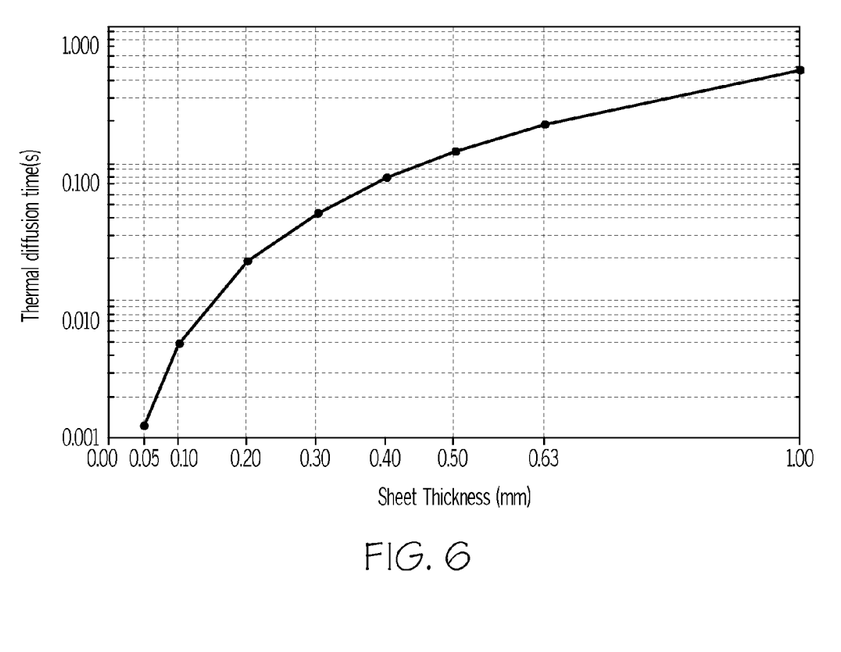
FIG. 6 graphically depicts the relationship between the thickness of the glass substrate and the thermal diffusion time through the thickness of the glass substrate.

Equation 4, which is graphically depicted in FIG. 6 on a log-log scale, demonstrates that the thermal diffusion time through the thickness of a glass substrate is a function of the square of the thickness of the glass substrate. As shown in FIG. 6, the thermal diffusion time $\tau$ decreases rapidly with decreasing thickness of the glass substrate. For example, for a glass substrate having a thickness of 0.63 mm, the thermal diffusion time is roughly 0.2 seconds. However, when the thickness of the glass is reduced by half (i.e., the substrate has a thickness of 0.3 mm), the thermal diffusion time is only 0.045 seconds. This rapid diffusion of heat through the glass substrate causes the glass substrate to rapidly lose heat through both surfaces of the glass substrate simultaneously. More specifically, as the thickness of the glass decreases, surface heat convection losses increases and the glass cools more rapidly. The surface convection temperature drop in the glass body is proportional to the surface to volume ratio of the glass substrate. When the glass loses heat from only one surface (e.g., when the glass is thick), the temperature drop due to convection losses is proportional to 1/h. However, when the glass loses heat from both the top and bottom surfaces (e.g., when the glass is thin), the temperature drop due to surface convection losses is 2/h. The effect of this rapid heat loss is graphically illustrated in FIG. 7.

Figure 7:
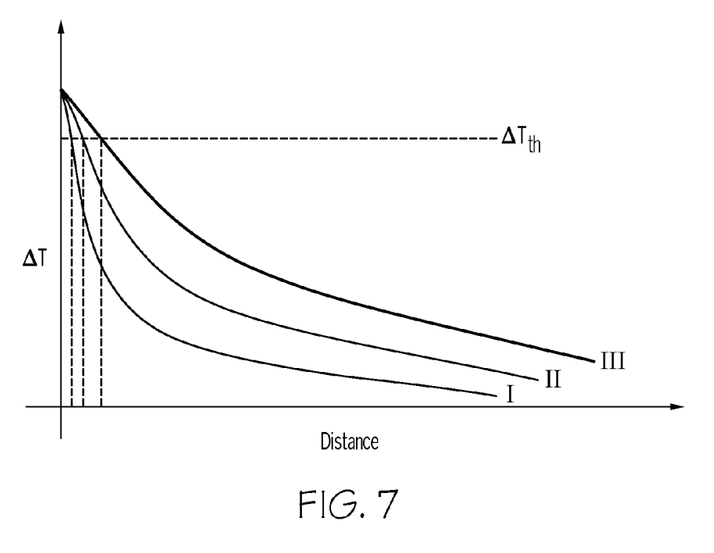
FIG. 7 graphically depicts the relationship between the placement of the cooling spot from the maximum temperature of the surface of the glass substrate and the change in temperature at the surface of the glass substrate for glass substrates having three different thicknesses.

FIG. 7 graphically depicts the relationship between the placement of the cooling spot from the maximum temperature of the glass substrate and the change in temperature at the surface of the glass substrate for glass substrates of three different thicknesses. The x-axis represents the distance from the maximum temperature $T_{max}$ on the surface of the glass substrate with the origin being the maximum temperature. The y-axis represents the change in surface temperature prior to cooling jet quenching for three glass substrates of thicknesses I, II, and III where I<II<III. As shown, in FIG. 7, as the thickness of the glass substrate decreases and heat is lost from both surfaces of the glass substrate, the cooling spot must be moved closer to the maximum temperature $T_{max}$ on the surface of the glass substrate in order to achieve or exceed the threshold change in temperature $\Delta T_{TH}$ and thereby initiate and propagate a vent in the surface of the glass substrate.

Accordingly, for glass substrates having thicknesses of less than about 0.6 mm, the rapid heat loss from both surfaces of the glass substrate necessitates that the quenching process and, more specifically, the location of the cooling jet and cooling spot on the surface of the glass substrate relative to the elliptical beam spot, be controlled to facilitate the formation of vents which extend partially through the thickness of the glass substrate, particularly for glass substrates with low coefficients of thermal expansion such as, for example, borosilicate glasses.

In order to achieve or exceed the threshold change in temperature $\Delta T_{TH}$ for vent formation and propagation, the temperature to which the glass substrate is heated may be maximized. However, as noted hereinabove, the maximum temperature to which the glass substrate can be heated is limited by the strain temperature of the glass. Further, for glass substrates with thicknesses of less than about 0.6 mm, rapid thermal diffusion through the thickness of the glass substrate causes the temperature at the surface of the glass substrate to rapidly decrease following heating to a maximum temperature. Accordingly, to achieve or exceed the threshold change in temperature $\Delta T_{TH}$ and thereby initiate and propagate a vent in the surface of the glass substrate, the position of the cooling jet (and therefore the position of the cooling spot) should be adjusted in order to quench the glass substrate from a temperature at or near the maximum temperature obtained during heating of the glass surface with the laser source.

Figure 8:
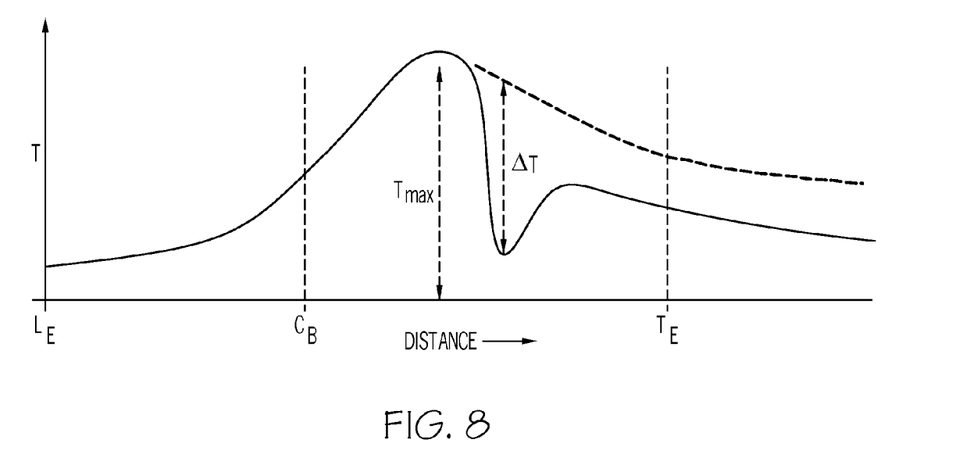
FIG. 8 graphically depicts the instantaneous temperature distribution in the glass substrate as the elliptical beam spot is traversed over the substrate from left to right with the leading edge of the elliptical beam spot proximate the origin according to one embodiment shown and described herein.

Referring now to FIGS. 3 and 8, FIG. 8 graphically depicts an instantaneous temperature distribution in the glass substrate around the elliptical beam spot 102 with increasing distance from the leading edge 120 of the elliptical beam spot. The temperature distribution is plotted in the direction of the major axis of the elliptical beam spot. The leading edge ($L_E$) of the beam spot is positioned at the origin of the axes such that the length of the beam extends along the x-axis. Accordingly, it should be understood that the x-axis is the distance from the leading edge. The corresponding temperature of the surface of the glass substrate is represented on the y-axis. The position of the maximum temperature $T_{max}$ of the surface of the glass substrate is indicated as well as the change in temperature $\Delta T$ following quenching. The dashed line represents the temperature dissipation in the glass substrate without quenching. The maximum temperature at the surface of the glass substrate due to heating with the laser source occurs at a point within the elliptical beam spot between the center ($C_B$) of the elliptical beam spot and the trailing edge ($E_T$) of the elliptical beam spot. When the surface of the glass substrate is quenched at or near the maximum temperature the resulting change in temperature $\Delta T$ is sufficient to exceed the change in temperature threshold $\Delta T_{TH}$ and thereby enable vent initiation and propagation. Therefore, by positioning the cooling jet such that the cooling jet is incident on the surface of the glass substrate between the center of the elliptical beam spot and the trailing edge of the elliptical beam spot and the cooling spot is at or near the maximum temperature (i.e., the cooling spot is non-concentric with the elliptical beam spot), the change in temperature $\Delta T$ following quenching exceeds the change in temperature threshold $\Delta T_{TH}$ such that a vent is formed and propagated in the surface of the glass substrate.

Referring to FIGS. 1-3, in one embodiment described herein, the nozzle 160 is oriented such that the cooling spot 106 is positioned on the surface 130 of the glass substrate 100 on the scribe line 104 and within the elliptical beam spot 102.

More specifically, the nozzle 160 is oriented such that the cooling spot is located within the elliptical beam spot between the center of the elliptical beam spot and the trailing edge 122 of the elliptical beam spot such that the cooling spot is spaced apart from the trailing edge by a distance z, as shown in FIG. 3. In this position the cooling spot 106 is at or near the maximum temperature on the surface of the glass substrate due to heating by the laser source. Accordingly, because the glass substrate is quenched by the cooling jet at or near the maximum temperature, the resulting change in temperature ΔT (assuming the glass surface is heated to just below the strain temperature $T_g$) exceeds the change in temperature threshold $\Delta T_{TH}$ thereby facilitating the formation of the vent 108 which initially propagates from the defect 112. Moreover, because the surface of the glass is quenched at or near the maximum temperature, quenching occurs before the temperature equilibrates through the entire thickness of the glass substrate. Therefore, the formation of the vent is limited to the depth l to which the heat diffuses into the substrate prior to quenching thereby mitigating the formation of a vent substantially through the entire thickness of the glass substrate and the onset of uncontrolled and irreversible splitting.

Referring to FIGS. 1 and 2, after the cooling jet 105 and cooling spot 106 are properly oriented with respect to the elliptical beam spot 102, the cooling jet and laser source are advanced along the surface 130 of the glass substrate 100 on the scribe line 104 in the scribing direction 110. As the surface of the glass substrate is heated to the maximum temperature and quenched at or near the maximum temperature the vent 108 is propagated from the defect 112 and along the scribe line 104. The cooling jet and laser source are advanced relative to the surface of the substrate at a scribing speed v which, in turn, is the minimum speed of vent propagation along the scribe line 104. As described hereinabove, the scribing speed v is generally selected such that overheating of the surface of the glass substrate is avoided while still allowing the surface of the glass substrate to be heated to just below the strain temperature of the glass. Following formation of the vent 108, a bending moment is applied to the glass substrate 100 on one or both sides of the vent thereby mechanically separating the glass substrate along the vent.

Figure 4:
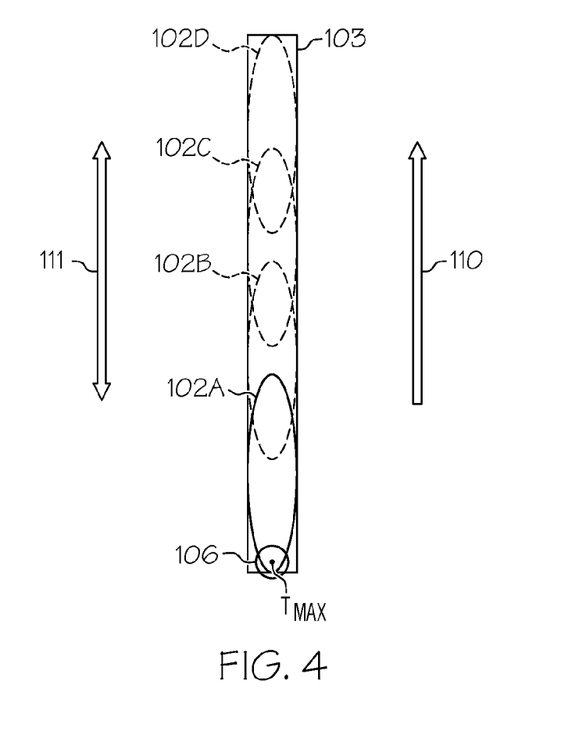
FIG. 4 schematically depicts the relative positioning of the elliptical beam spot and cooling spot as the elliptical beam spot is scanned according to at least one embodiment of the method for forming a vent in a glass substrate shown and described herein.

Referring now to FIGS. 1-2 and 4, in an alternative embodiment, the beam 101 of the laser source 150 is scanned along the scribe line 104 in the scanning direction 111 as the laser source 150 and the cooling jet 105 are advanced over the surface 130 of the glass substrate 100 in the scribing direction 110, as is schematically depicted in FIG. 4. The beam is scanned with a scanning device positioned in the optical pathway of the beam, as described hereinabove. FIG. 4 shows four positions of the beam spot (102A-102D) as the beam spot is scanned in the scanning direction 111. Specifically, FIG. 4 shows the position of the beam spot as the beam is scanned forward, in the scribing direction 110. The beam spot may have an elliptical shape however, due to the scanning action, the beam spot may appear roughly rectangular, as indicated by rectangle 103, and have an intensity distribution which is substantially uniform in the direction of scanning and/or scribing. The beam may be scanned at a speed of at least 0.5 m/s and, more preferably, at least 1.0 m/s. The length over which the beam is scanned along the scribe line varies depending on the dimensions of the glass substrate. In general, the beam is scanned along the scribe line over a length greater than about 10 mm. The cooling jet and laser source are positioned relative to one another such that, as the beam of the laser source is scanned back and forth along the scribe line, the cooling spot 106 of the cooling jet is positioned at or near the point on the surface of the glass substrate where the temperature at the surface of the glass substrate is at a maximum ($T_{max}$) due to heating with the laser beam.

Using the aforementioned scanning technique where the cooling spot 106 is positioned at or near the maximum temperature to which the substrate is heated by the laser source, as described above, facilitates forming a vent partially through the thickness of the glass substrate. The scanning technique permits the use of higher power laser sources while mitigating the possibility of surface ablation by reducing the time which the elliptical beam spot is incident on any given point of the glass surface along the scribe line. Following formation of the vent 108, a bending moment may be applied to the glass substrate 100 on one or both sides of the vent thereby mechanically separating the glass substrate along the vent.

The methods described hereinabove can be used to form one or more vents in glass substrates with thicknesses of less than about 0.6 mm thereby facilitating the use of the scribe-and-break technique to separate such glass substrates into a plurality of smaller pieces. For example, FIGS. 5A and 5B graphically depict one method for separating a glass substrate into a plurality of pieces using the vent formation methods described herein.

Figure 5A:
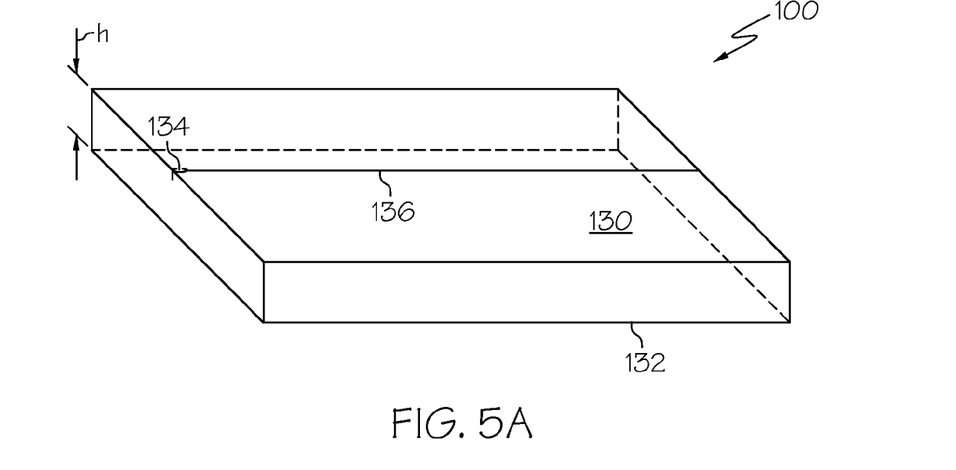
FIGS. 5A and 5B schematically depict a method of separating a glass substrate into a plurality of pieces according to at least one embodiment shown and described herein.
Figure 5B:
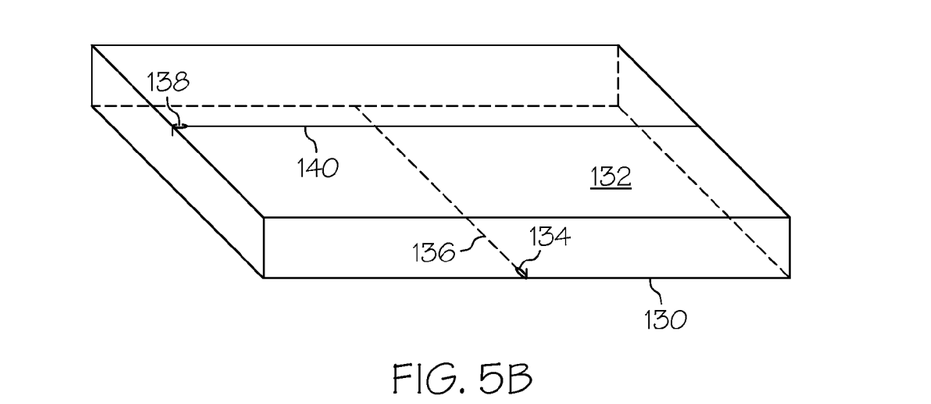

Referring to FIGS. 5A and 5B, a glass substrate 100 is depicted which comprises an upper surface or first surface 130 and a lower surface or second surface 132 which are in opposition to one another. The glass substrate 100 is separated into a plurality of pieces by first introducing a first defect 134 into the surface of the glass substrate 100 on the first surface 130. In one embodiment the first defect 134 is positioned on the surface of the first surface 130 of the glass substrate 100 such that the first defect 134 is directly adjacent the edge of the substrate as shown in FIG. 5A. Alternatively, the first defect 134 may be offset from the edge of the substrate towards the interior of the glass substrate 100. The first defect 134 may be formed in the surface of the glass substrate 100 using a mechanical scribe, such as a diamond or carbide point or wheel, or by laser ablation.

After the first defect 134 is formed on the first surface 130 of the glass substrate 100, a vent 136 is opened in the glass substrate 100 along a scribe line extending through the first defect 134 using one of the vent formation techniques described herein above. For example, in one embodiment, an elliptical beam spot of a $CO_2$ laser is directed onto the first defect 134 such that the major axis of the elliptical beam spot is substantially aligned on the scribe line. Thereafter, a cooling jet is directed onto the glass substrate such that the cooling spot of the cooling jet is positioned within the elliptical beam spot between the center point of the beam spot and the trailing edge of the beam spot. Accordingly, it should be understood that the elliptical beam spot and the cooling spot are non-concentric with one another. The position of the cooling spot within the elliptical beam spot is selected such that the cooling spot is positioned on or as close as possible to the point within the elliptical beam spot where the surface of the glass substrate reaches a maximum temperature due to laser heating.

The elliptical beam spot and the cooling spot are then directed over the surface of the glass substrate along the scribe line thereby opening a first vent 136 in the glass substrate that extends partially through the thickness of the glass substrate, as described above. In general, the first vent 136 in the glass substrate 100 generally extends through less than a quarter of the thickness h of the glass substrate. In the embodiment shown in FIG. 5A, the first vent 136 generally extends between opposing edges of the glass substrate 100. However, it should be understood that the first vent 136 may also extend between adjacent edges of the glass substrate 100 and the first defect 134 and the scribe line may be appropriately oriented to achieve this result.

After the first vent 136 is formed in the glass substrate 100, a second vent 140 is formed in the lower surface or second surface 132 of the glass substrate 100. In one embodiment, in order to form the second vent 140 in the second surface of the glass substrate 100, the glass substrate is flipped over such that the positioning of the first surface 130 and the second surface 132 is reversed (i.e., the second surface 132 is the upper surface and the first surface 130 is the lower surface). In one embodiment flipping the glass substrate is performed manually, such as by a technician or operator. Alternatively, the glass substrate can be flipped using one or more mechanical gripping devices, such as vacuum chucks or similar devices, which adhere to the surface of the glass substrate and facilitates maneuvering the glass substrate to the desired position.

In the embodiments described herein, the glass substrate is rotated to achieve the desired orientation between the first vent and the second vent. For example, in the embodiment shown in FIG. 5B, the first defect 134 and the second vent 140 are oriented at 90° relative to one another. However, it should be understood that the first vent 136 and the second vent 140 may have any angular orientation with respect to one another.

Once the second surface 132 of the glass substrate is properly oriented, a second defect 138 is introduced into the surface of the glass substrate 100 on the second surface 132. As described hereinabove with respect to the first defect 134, a second defect 138 is positioned on the surface of the second surface 132 of the glass substrate 100 such that the second defect 138 is directly adjacent the edge of the substrate as shown in FIG. 5B.

After the second defect 138 is formed on the second surface 132 of the glass substrate 100, a second vent 140 is opened in the glass substrate 100 along a scribe line extending through the second defect 138 using one of the vent formation techniques described hereinabove. The second vent 140 is formed in the surface of the glass substrate 100 in substantially the same manner as the first vent 136. The second vent 140 generally extends between opposing edges of the glass substrate 100. However, it should be understood that the second vent 140 may extend between adjacent edges of the glass substrate 100 and the second defect 138 and the scribe line may be appropriately oriented to achieve this result. In one embodiment, the first vent 136 and the second vent 140 are not parallel with one another. Alternatively, the second vent 140 is not located in a plane which is perpendicular to one of the surfaces of the glass substrate and which also contains the first vent 136.

While the embodiments of the method for separating a glass substrate described herein describe the glass substrate as being flipped between formation of the first vent and the second event, it should be understood that, in alternative embodiments, the glass substrate may remain stationary so long as the first vent and the second vent are formed on opposite sides of the glass substrate. For example, the first vent 136 may be formed in the glass substrate 100 by directing a laser beam and cooling jet onto the glass substrate from above the glass substrate while the second vent 140 may be formed in the glass substrate 100 by directing a laser beam and cooling jet onto the glass substrate from below the glass substrate.

Once the first vent 136 and the second vent have been formed in the glass substrate 100, the glass substrate is mechanically separated into a plurality of pieces along the vents by applying a bending moment about each of the vents. For example, once the glass substrate is separated along the first vent 136 by applying a bending moment to the glass substrate 100 about the first vent 136, the resulting pieces are further separated into smaller pieces by applying a bending moment about the second vent 140. In this manner, the glass substrate 100 may be divided into at least four discrete pieces.

While in the embodiments shown and described herein a single vent is introduced into the glass substrate on each of the first surface and the second surface of the glass substrate such that the glass substrate is divided into four discrete pieces, it should be understood that a plurality of glass vents may be introduced on each of the first surface and the second surface of the glass substrate such that the glass substrate may be divided into more than four discrete pieces.

EXAMPLES

The methods for forming a vent partially through a glass substrate described hereinabove will now be described further with reference to specific examples. In each example a vent extending partially through the thickness of the glass substrate was formed in glass substrate having thicknesses of less than about 0.6 mm.

Example 1

The beam spot of a $CO_2$ laser with a wavelength of 10.6 μm and a power of 38 Watts was directed onto the surface of a borosilicate glass plate (CTE=$32 \times 10^{-7}$/° C.) with a thickness of 308 μm. The beam spot had a minor axis a=2 mm and a major axis b=24 mm. The beam spot was initially positioned on a defect in the surface of the glass substrate and aligned along a scribe line such that the major axis of the beam spot was collinear with the scribe line. A cooling jet of de-ionized water was directed onto the substrate through a 75 μm orifice of a nozzle at a rate of 8 sccm. The cooling jet had an angle of incidence of 85° relative to the surface of the substrate and formed a cooling spot of approximately 2 mm in diameter on the surface of the glass substrate. The cooling spot was positioned within the elliptical beam spot of the $CO_2$ laser approximately 5 mm from the trailing edge. The elliptical beam spot and cooling jet were advanced along the scribe line at a rate of 4 m/min forming a vent having a depth of 71 μm in the surface of the glass substrate.

Example 2

The beam spot of a $CO_2$ laser with a wavelength of 10.6 μm and a power of approximately 100 Watts was directed onto the surface of a borosilicate glass plate (CTE=$32 \times 10^{-7}$/° C.) with a thickness of 300 μm. The beam spot had a minor axis a=2 mm and a major axis b=24 mm. The beam spot was initially positioned on a defect in the surface of the glass substrate and aligned along a scribe line such that the major axis of the beam spot was collinear with the scribe line. A cooling jet comprising de-ionized water was directed onto the substrate through a 75 μm orifice of a nozzle at a rate of 8 sccm. The cooling jet had an angle of incidence of 85° relative to the surface of the substrate and formed a cooling spot of approximately 2 mm in diameter on the surface of the glass substrate. The cooling spot was positioned within the elliptical beam spot of the $CO_2$ laser approximately 5 mm from the trailing edge. The elliptical beam spot and cooling jet were advanced along the scribe line at a rate of 150 mm/sec forming a vent having a depth of 62 μm in the surface of the glass substrate.

Example 3

The beam spot of a $CO_2$ laser with a wavelength of 10.6 μm and a power of 92 Watts was directed onto the surface of an alkali-aluminosilicate glass plate (CTE=91×10⁻⁷/° C.) with a thickness of 300 μm. The beam spot had a minor axis a=2 mm and a major axis b=24 mm. The beam spot was initially positioned on a defect in the surface of the glass substrate and aligned along a scribe line such that the major axis of the beam spot was collinear with the scribe line. A cooling jet comprising de-ionized water was directed onto the substrate through a 75 μm orifice of a nozzle at a rate of 8 sccm. The cooling jet had an angle of incidence of 85° relative to the surface of the substrate and formed a cooling spot of approximately 2 mm in diameter on the surface of the glass substrate. The cooling spot was positioned within the elliptical beam spot of the $CO_2$ laser approximately 5 mm from the trailing edge. The elliptical beam spot and cooling jet were advanced along the scribe line at a rate of 200 mm/sec forming a vent having a depth of 57 μm in the surface of the glass substrate.

Example 4

The beam spot of a $CO_2$ laser with a wavelength of 10.6 μm and a power of 92 Watts was directed onto the surface of an ion-exchange strengthened alkali-aluminosilicate glass plate (CTE=91×10⁻⁷/° C.) with a thickness of 550 μm and a central tension of 15 MPa. The beam spot had a minor axis a=2 mm and a major axis b=24 mm. The beam spot was initially positioned on a defect in the surface of the glass substrate and aligned along a scribe line such that the major axis of the beam spot was collinear with the scribe line. A cooling jet comprising de-ionized water was directed onto the substrate through a 75 μm orifice of a nozzle at a rate of 8 sccm. The cooling jet had an angle of incidence of 85° relative to the surface of the substrate and formed a cooling spot of approximately 2 mm in diameter on the surface of the glass substrate. The cooling spot was positioned within the elliptical beam spot of the $CO_2$ laser approximately 5 mm from the trailing edge. The elliptical beam spot and cooling jet were advanced along the scribe line at a rate of 220 mm/sec forming a vent having a depth of 90 μm in the surface of the glass substrate.

It should now be understood that the methods described herein may be used to separate thin glass substrates (i.e., glass substrates with thicknesses less than about 0.6 mm) with relatively low CTEs, such as glass substrates made from borosilicate glasses, as well as glass substrates with relatively high CTEs, such as substrates formed from aluminosilicate glasses including ion-exchange strengthened aluminosilicate glasses. For glass substrates with low CTEs the methods described herein enable vent formation by providing a suitable change in temperature following quenching to induce tensile stresses along the scribe line. For glass substrates with high CTEs the methods described herein increase the speed at which vents may be formed in the glass substrate by reducing heat loss from the glass substrate prior to quenching.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:
1. A method of forming a vent in a glass substrate, the method comprising:
   forming a defect in the glass substrate on a scribe line;
   directing a beam spot of a laser onto the defect and advancing the beam spot along the scribe line; and
   directing a cooling jet onto the defect and advancing the cooling jet along the scribe line with the beam spot to form the vent in the glass substrate, wherein a cooling spot of the cooling jet is positioned on a surface of the glass substrate such that the surface is cooled from a maximum temperature, and a change in temperature $\Delta T$ of a surface of the glass substrate due to cooling satisfies the equation:

$$\Delta T \geq \frac{2\sigma_{th}}{CTE \cdot E},$$

where:
   $\sigma_{th}$ is a threshold tensile stress for forming the vent;
   CTE is a coefficient of thermal expansion of the glass substrate; and
   E is the Young's modulus of the glass substrate.

2. The method of claim 1 wherein the beam spot is elliptical with a major axis substantially aligned with the scribe line and the cooling spot is positioned within the beam spot.

3. The method of claim 2 wherein the cooling spot is spaced apart from a trailing edge of the elliptical beam spot.

4. The method of claim 2 wherein the cooling spot is positioned between a center of the elliptical beam spot and a trailing edge of the elliptical beam spot.

5. The method of claim 2 wherein:
   the major axis of the elliptical beam spot has a length b such that $b \leq 3 \cdot v \cdot \tau$, where v is a scribing speed at which the laser beam and cooling jet are advanced over a surface of the glass substrate and $\tau$ is a heat diffusion time through the glass substrate; and
   a minor axis of the elliptical beam spot has a length that is greater than or equal to a diameter of the cooling jet where the cooling jet contacts the surface of the glass substrate.

6. The method of claim 1 wherein the beam spot is scanned along the scribe line as the elliptical beam spot is advanced along the scribe line.

7. The method of claim 1 wherein the cooling jet is directed onto a surface of the glass substrate at an angle with respect to the surface of the glass substrate.

8. The method of claim 1 wherein the thickness of the glass substrate is less than about 0.6 mm.

9. The method of claim 1 wherein the glass substrate is selected from the group consisting of borosilicate glass substrates and aluminosilicate glass substrates.

10. A method for forming a vent in a glass substrate, the method comprising:
   forming a defect in the glass substrate on a scribe line;
   directing a laser beam with an elliptical beam spot onto the defect and advancing the elliptical beam spot along the scribe line; and
   directing a cooling jet onto the defect such that a cooling spot of the cooling jet is within the elliptical beam spot and advancing the cooling jet along the scribe line with the elliptical beam spot such that the cooling spot remains within the elliptical beam spot to form the vent in the glass substrate, wherein the vent extends partially through a thickness of the glass substrate.

11. The method of claim 10 wherein a major axis of the elliptical beam spot is substantially aligned with the scribe line and the cooling spot is positioned within the elliptical beam spot between a center of the elliptical beam spot and a trailing edge of the elliptical beam spot.

12. The method of claim 10 wherein the cooling spot is positioned within the elliptical beam spot such that a change in temperature ΔT of a surface of the glass substrate due to cooling satisfies the equation:

$$\Delta T \geq \frac{2\sigma_{th}}{CTE \cdot E},$$

where:
- $\sigma_{th}$ is a threshold tensile stress for forming the vent;
- CTE is a coefficient of thermal expansion of the glass substrate; and
- E is the Young's modulus of the glass substrate.

13. The method of claim 10 wherein the thickness of the glass substrate is less than about 0.6 mm.

14. The method of claim 10 wherein a major axis of the elliptical beam spot is substantially aligned with the scribe line and:
- the major axis of the elliptical beam spot has a length b such that $b \leq 3 \cdot v \cdot \tau$, where v is a scribing speed at which the laser beam and the cooling jet are advanced along the scribe line and τ is a heat diffusion time through the glass substrate; and
- a minor axis of the elliptical beam spot has a length that is greater than or equal to a diameter of the cooling spot on the glass substrate.

15. A method for separating a glass substrate into a plurality of pieces, the method comprising:
- forming a first defect on a first surface of the glass substrate;
- opening a first vent along a scribe line extending from the first defect, wherein the first vent extends partially through a thickness of the glass substrate;
- forming a second defect on a second surface of the glass substrate;
- opening a second vent along the scribe line extending from the second defect, wherein the second vent extends partially through the thickness of the glass substrate; and
- mechanically separating the glass substrate along the first vent and the second vent, wherein the first vent and the second vent are opened by:
  - directing a laser beam with an elliptical beam spot onto a defect and advancing the elliptical beam spot along the scribe line; and
  - directing a cooling jet along the scribe line and advancing the cooling jet along a surface of the glass substrate on the scribe line with the elliptical beam spot to form a vent in the glass substrate, wherein a cooling spot of the cooling jet is positioned within the elliptical beam spot such that the cooling spot remains within the elliptical beam spot and a surface of the glass substrate is cooled from a maximum temperature.

16. The method of claim 15 wherein the cooling spot is statically positioned within the elliptical beam spot between a center of the elliptical beam spot and a trailing edge of the elliptical beam spot as the elliptical beam spot and the cooling jet are advanced along the surface of the glass substrate on the scribe line.

17. The method of claim 15 wherein the elliptical beam spot is scanned along the scribe line on the surface of the glass substrate as the elliptical beam spot is advanced along the scribe line.

18. The method of claim 15 wherein the first vent and the second vent are perpendicular to one another.

19. The method of claim 15 wherein the first defect is spaced apart from a first edge of the glass substrate and the second defect is spaced apart from a second edge of the glass substrate.

* * * * *